W. SCHULTZE.
SOLID COMPOUND OF NITRIC AND SULFURIC ANHYDRIDS AND PROCESS OF MAKING SAME.
APPLICATION FILED MAY 5, 1908.
Patented Dec. 17, 1912.
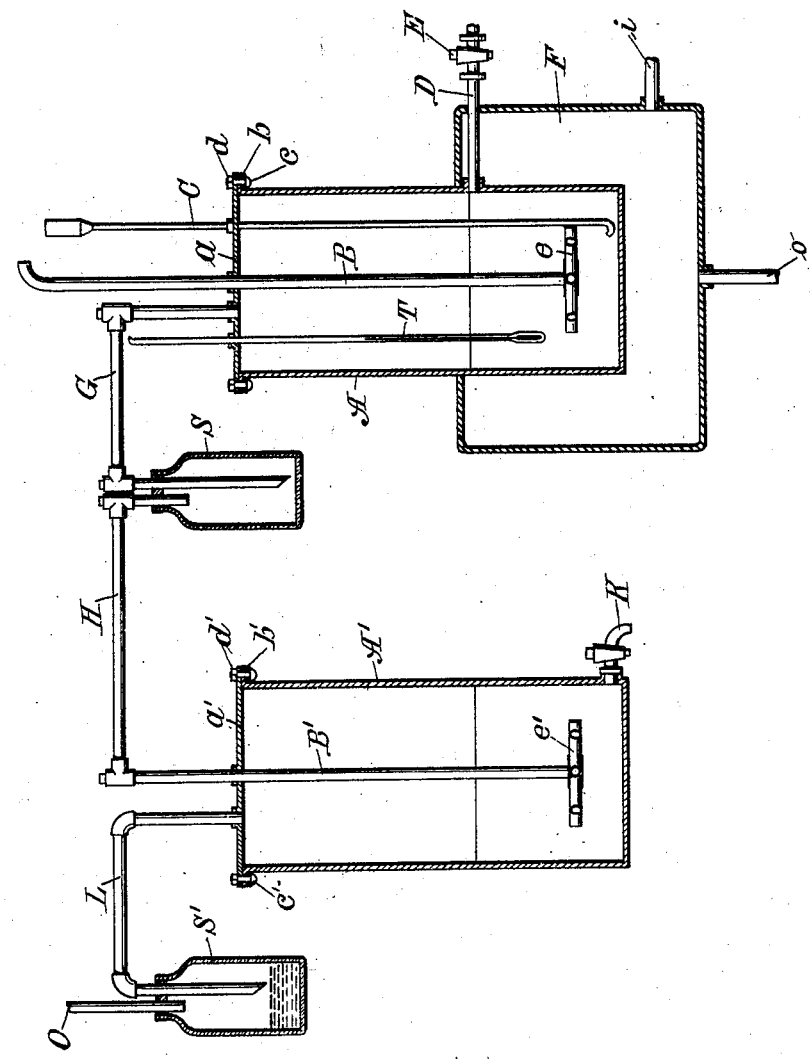

UNITED STATES PATENT OFFICE.

WILLIAM SCHULTZE, OF NEW YORK, N. Y., ASSIGNOR TO GENERAL CHEMICAL COMPANY, OF NEW YORK, N. Y., A CORPORATION OF NEW YORK.

SOLID COMPOUND OF NITRIC AND SULFURIC ANHYDRIDS AND PROCESS OF MAKING SAME.

1,047,576.

Specification of Letters Patent.   Patented Dec. 17, 1912.

Application filed May 5, 1908.   Serial No. 430,914.

*To all whom it may concern:*

Be it known that I, WILLIAM SCHULTZE, a citizen of the United States, and resident of Maspeth, Long Island, in the county and borough of Queens, city and State of New York, have invented certain new and useful Improvements in Solid Compounds of Nitric and Sulfuric Anhydrids and Processes of Making Same, of which the following is a specification.

This invention relates to a solid crystalline compound containing sulfuric and nitric acids, or, more precisely, their anhydrids, chemically combined together.

Mixtures of sulfuric and nitric acids are largely used in certain manufacturing processes, for "nitrating," and have hitherto been supplied to the trade in liquid form, and more or less diluted state—*i. e.*, containing water in proportion more than sufficient to completely hydrate at least one of the two acid anhydrids contained in the mixture.

A solid mixed acid compound, such as may be prepared according to this invention, and containing a proportion of water materially less than that of the liquid mixtures commonly employed, will present a number of evident advantages such as economy in cost of transport, convenience in handling and packing, and uniformity in composition.

The accompanying drawing is a sectional elevation of an apparatus suitable for carrying out this invention.

This apparatus consists of two cylindrical absorbers A and A', preferably made of lead, and closed at the top by lead covers *a, a'* clamped to the main body by iron rims *b, b'*, screw bolts *c, c'*, and nuts *d, d'*.

Sulfur trioxid gas or vapor, or a suitable gaseous mixture containing the same (such as is obtained for instance by the contact process) is introduced through the lead pipe B, which terminates near the bottom of A in a number of horizontal radial branches *e*. Nitric acid, preferably of not less than 94% strength, is simultaneously fed into A through the glass tube C which communicates at the top with a reservoir (not shown in the drawing). The lower end of C may be slightly bent and preferably reaches below the orifices through which the $SO_3$ is discharged from the branches *e*. The absorber A is provided with a lateral discharge pipe D, carrying a stopcock E, for withdrawing intermittently or continuously a portion of the contents of A. F is a steam-jacket, with steam inlet *i*, and outlet *o* for steam and water. It surrounds the lower portion of A, extending up above D. Its purpose is to maintain a suitable temperature within A, that is to say, to keep the same sufficiently high to prevent solidification of the bath therein, while at the same time preventing it from rising to the point at which the product decomposes with liberation of nitrous fumes. Much of the heat required to maintain the proper temperature is furnished directly by the reaction and absorption itself.

T is a thermometer for observing the temperature in A. A convenient temperature to maintain is about that of open steam, 100 deg. C. Other means may be substituted for the steam-jacket F.

From A the unabsorbed and uncondensed gases or vapors pass out through a lead pipe G into a "sight bottle" S, and thence through another lead pipe H, with vertical limb B' and distributing branches *e'*, similar to the branches *e* in A. These distributing branches *e'* are immersed in sulfuric acid, preferably of 97–98% strength, which serves to arrest and recover practically all the vapors of $SO_3$ and $HNO_3$ which escape absorption in A. The acid in A' requires occasional renewal. A tap K is provided for withdrawing this acid when desired. From A' the residual gases pass through pipe L to a second "sight bottle" S', containing a layer of water at the bottom, and thence to the pump or other device employed to draw the gases through the apparatus.

To operate the apparatus described, the absorber A is first of all charged with a mixture of about 300 parts fuming sulfuric acid containing about 60% free $SO_3$, and about 70 parts of nitric acid containing about 96% $HNO_3$. The second absorber is charged with sulfuric acid of about 98% strength. A current of sulfur trioxid gas or vapor, or gases or vapors containing the same, is then aspirated through the apparatus, entering the same at the inlet of B and bubbling through the mixed acids. The residual gases pass off to the pump or other draft producing device (not shown in drawing) at O. At the same time a regulated stream of nitric acid is fed in through C. The streams of $SO_3$ and $HNO_3$ are regulated in accordance with the appearance of the sight bottles S and S', in which there should be at the most only a slight mist. The stream of $HNO_3$ may also be regulated in proportion to the $SO_3$ passed through, that is to say in accordance with the proportion in which these two ingredients occur in the product. The temperature in A is kept at about 100 deg. C by the aid of the steam bath F. The product is withdrawn continuously or intermittently through discharge pipe D and cock E, and is allowed to crystallize. It may, if desired, be purified by re-melting, re-crystallizing and draining off the mother liquor preferably by suction, care being taken to exclude moisture from the apparatus throughout such operations.

The invention may be carried out in various other ways. Thus, instead of bubbling $SO_3$ through a liquid bath of mixed sulfuric and nitric acids, such a mixture may be caused to flow down a tower through which at the same time sulfur trioxid is passed. Again, the composition of the liquid in the absorber may be varied. It may, at the commencement of the operation consist only of nitric acid, which is at first gradually saturated with sulfur trioxid (without feeding in any further quantity of nitric acid), until it has acquired a suitable composition, such as that of the product to be withdrawn, after which sulfur trioxid and nitric acid are fed simultaneously, as in the example quoted in full above. A similar treatment can evidently be applied to mixtures of sulfuric and nitric acids which contain relatively too high a percentage of nitric acid or of water. In the last case it may be necessary to add, not only sulfur trioxid, but also concentrated nitric acid. The absorbing liquid may also for example consist of mother liquor from a previous operation (*e. g.* if the product is recrystallized) or of a melted down portion of a previous batch of crystals. If the composition of the absorbing acid departs considerably from that of the crystallized product, the liquid drawn from the absorber will not set completely solid, but will separate into crystals and mother liquor. The crystals may be freed from mother liquor by any of the known methods (draining, centrifugal action) carefully excluding moisture, and the mother liquor may be returned to the absorber.

Another manner of carrying out this invention consists in conducting vapor of sulfuric anhydrid and nitric acid, conveyed, say, in a current of warm dry air, into a suitable chamber, in which combination takes place with formation of the mixed-acid crystals.

Lastly may be quoted an example in which the sulfuric anhydrid is presented, not in the form of vapor, but in the form of "fuming sulfuric acid" or "oleum." To 327 grams of nitric acid containing about 96% $HNO_3$ were gradually added, cooling occasionally, 1255 grams of oleum containing 68% free sulfuric anhydrid. Crystallization started before the mixture had assumed room-temperature. After 48 hours' standing the crystals were separated as far as possible from the mother liquor on a suction filter supplied with air dried over sulfuric acid. The total weight of crystals obtained was about 1060 grams, or 67% of the initial material, that of the mother liquor, 322 grams or 33%.

Other proportions of nitric acid and oleum may be used instead of those indicated above, although not all proportions are equally favorable to obtaining a good yield. In my investigations I have found that crystals of the composition corresponding to the formula $N_2O_5(SO_3)_4H_2O$ can be obtained from mixtures of nitric acid and oleum containing from 12% to 27% of concentrated nitric acid.

The properties of the crystallized product prepared by any of the above methods are as follows: The crude crystals are of irregular shape as a rule; sometimes they form rectangular plates, more or less well defined, according to the rate of their formation. Their color varies from yellow to white. Their specific gravity is about 2.18. Their melting point varies according to their degree of purity, say from 93 to 104 deg. C. When heated to 170 deg. C. they undergo partial decomposition, with effervescence. A sample, kept for about two minutes at this temperature, was found on analysis to have increased by .02% in $N_2O_3$ content. Another sample was further heated for about 15 minutes, until the temperature reached 214 deg. C, when titration with potassium permanganate showed that about 25% of the nitric acid present had by this time decomposed.

The crystals are strongly hygroscopic. Their vapor pressure is small, consequently they do not fume appreciably when exposed to the air at ordinary temperature, and when kept in rubber-stoppered bottles for months, hardly attack the rubber. The practical advantages resulting from this low vapor tension and high melting point are obvious, since the former limits to points at which there is actual contact any corrosive action which the mixed acid crystals might have upon the containers used in storage and transport; while the latter insures that the material retains its solid form under all ordinary conditions of storage and transport.

The composition of some of the crystals obtained is shown in the subjoined tabulated results of analyses, together with which are quoted, for comparison, the corresponding figures calculated for a compound of a composition corresponding to the empirical formula $HO_9NS_2$. This, for convenience may be written: $N_2O_5(OS_3)_4H_2O$.

Table I shows the results of analysis directly, expressed as usual in terms of percentages, the water being determined by difference.

Table II shows the percentages of the essential constituents, calculated on the weight of the product diminished by the weight of the accidental impurities, viz., $N_2O_3$ and $PbSO_4$.

Table III shows the ratio of the amount of each of the normal constituents, (as stated in Table II) to the amounts theoretically corresponding to the formula $N_2O_5.(SO_3)_4.H_2O$.

TABLE I.

| | Crude crystals. | | Crystals, twice re-crystallized, sample B. | Calculated for $N_2O_5(SO_3)_4.H_2O$. |
|---|---|---|---|---|
| | Sample A. | Sample B. | | |
| $N_2O_5$ | % 22.90 | % 22.81 | % 24.18 | % 24.21 |
| $SO_3$ | 71.36 | 71.56 | 71.61 | 71.75 |
| $H_2O$ | 5.15 | 5.48 | 4.16 | 4.04 |
| $N_2O_3$ | .17 | .15 | .05 | |
| $PbSO_4$ | .42 | | | |

TABLE II.

| | Crude crystals. | | Crystals, twice re-crystallized, sample B. | Calculated for $N_2O_5(SO_3)_4.H_2O$. |
|---|---|---|---|---|
| | Sample A. | Sample B. | | |
| $N_2O_5$ | % 23.04 | % 22.84 | % 24.19 | % 24.21 |
| $SO_3$ | 71.78 | 71.76 | 71.65 | 71.75 |
| $H_2O$ | 5.18 | 5.18 | 4.16 | 4.04 |
| Total. | 100.00 | 100.00 | 100.00 | 100.00 |

TABLE III.

| | Crude crystals. | | Crystals, twice re-crystallized, sample B. | Calculated for $N_2O_5(SO_3)_4.H_2O$. |
|---|---|---|---|---|
| | Sample A. | Sample B | | |
| $N_2O_5$ | % 95.17 | % 94.34 | % 99.92 | % 100 |
| $SO_3$ | 100.04 | 99.92 | 99.86 | 100 |
| $H_2O$ | 128.22 | 135.90 | 102.97 | 100 |
| Total. | 323.43 | 330.16 | 302.75 | 300 |

Sample A was prepared with the lead apparatus and by the procedure described first in this specification. Sample B was prepared by the last described method, i. e., by mixing concentrated nitric acid and oleum.

While the products whose analysis is quoted in the above tables represent typical examples of the invention, it must be clearly understood that the composition of the product may vary more or less, although as a rule it will approximate toward the percentage composition corresponding to the formula $N_2O_5(SO_3)_4.H_2O$, as indicated above.

I am aware that a compound of a somewhat similar composition has been disclosed by Weber (*Pogg. Ann.* 1871, v. 142, p. 602). Weber's compound contained more water than the product described above, namely an amount corresponding to the formula $N_2O_5(SO_3)_4.3H_2O$, had no definite melting point, but decomposed when heated, with liberation of brown fumes (see *Pogg. Ann.* 1871, v. 142, *loc cit.*), and has never been of commercial utility, nor could it have been. This compound of Weber's is therefore only a laboratory curiosity without any practical utility, and I therefore do not claim herein such product or any process which yields such product.

Having thus described my invention, I claim:

1. As an article of manufacture, a solid composition containing sulfuric and nitric anhydrids and water in quantity less than that corresponding to three molecular proportions for every molecular proportion of the compound, which has the following properties, viz: that said compounds at ordinary temperatures form a water clear, white or yellowish, hygroscopic crystalline mass, sometimes displaying well-defined rectangular plates, which has a specific gravity of about 2.18, melts at 93–104 degrees C., and on further heating decomposes with evolution of nitrous fumes.

2. As an article of manufacture, the hereinbefore described compound of sulfuric anhydrid, nitric anhydrid and water in the proportions corresponding to the formula $N_2O_5(SO_3)_4.H_2O$, characterized by the following properties, viz., that said compound at ordinary temperatures forms a water-clear, white or yellowish, hygroscopic crystalline mass, sometimes displaying well defined rectangular plates, which has a specific gravity of about 2.18, melts at 93–104 deg. C., and on further heating decomposes with evolution of nitrous fumes.

3. The herein described process which consists in adding sulfuric anhydrid to concentrated nitric acid until a solution is formed from which crystals can be deposited upon cooling and then cooling such solution until crystals are deposited.

4. The herein described process which consists in absorbing sulfur trioxid vapor in a bath containing concentrated nitric acid until a solution is formed from which crystals can be deposited upon cooling and then cooling such solution until crystals are deposited.

5. The herein described process which consists in adding sulfuric anhydrid to a mixture of concentrated nitric acid and concentrated sulfuric acid until a solution is formed from which crystals can be deposited upon cooling and then cooling such solution until crystals are deposited.

6. The process which consists in absorbing sulfur trioxid vapor in a liquid consisting of concentrated nitric acid and fuming sulfuric acid in about that proportion which makes the ratio of the contained $N_2O_5$ to the total contained $SO_3$ as $N_2O_5:4SO_3$, said liquid being maintained at a temperature above about 100 deg. C., at the same time introducing a stream of concentrated nitric acid, regulating the rate of introduction of this stream so that the quantities of $SO_3$ and of $N_2O_5$ admitted per unit of time are about in the proportion indicated by the formula $N_2O_5:SO_3$, said regulation being effected in accordance with the indications presented by the appearance of the residual gases, withdrawing a portion of the absorbing liquid, allowing the same to cool with deposition of a solid, and collecting said solid product.

In testimony whereof I have hereunto set my hand this 1st day of May, 1908.

WILLIAM SCHULTZE.

Witnesses:
JOHN LOTKA,
JOHN A. KEHLENBECK.

---

Copies of this patent may be obtained for five cents each, by addressing the "Commissioner of Patents, Washington, D. C."